US012066128B2

United States Patent
Loussouarn et al.

(10) Patent No.: US 12,066,128 B2
(45) Date of Patent: Aug. 20, 2024

(54) ABANDONMENT AND RECOVERY OF PIPELINES

(71) Applicant: Acergy France SAS, Suresnes (FR)

(72) Inventors: Joffray Yann Noel Loussouarn, Paris (FR); William Alexander Grieve, Alford (GB)

(73) Assignee: ACERGY FRANCE SAS, Suresnes (FR)

( * ) Notice: Subject to any disclaimer, the term of this patent is extended or adjusted under 35 U.S.C. 154(b) by 0 days.

(21) Appl. No.: 17/264,787

(22) PCT Filed: Aug. 27, 2019

(86) PCT No.: PCT/IB2019/000982
§ 371 (c)(1),
(2) Date: Jan. 29, 2021

(87) PCT Pub. No.: WO2020/044125
PCT Pub. Date: Mar. 5, 2020

(65) Prior Publication Data
US 2021/0246998 A1  Aug. 12, 2021

(30) Foreign Application Priority Data

Aug. 31, 2018 (GB) ...................................... 1814217

(51) Int. Cl.
*F16L 1/20* (2006.01)
*F16L 1/225* (2006.01)
(Continued)

(52) U.S. Cl.
CPC ............... *F16L 1/207* (2013.01); *F16L 1/205* (2013.01); *F16L 1/206* (2013.01); *F16L 1/225* (2013.01);
(Continued)

(58) Field of Classification Search
CPC .... B63B 35/03; F16L 1/16; F16L 1/18; F16L 1/19; F16L 1/20; F16L 1/207; F16L 1/205; F16L 1/206; F16L 1/225; F16L 1/24
See application file for complete search history.

(56) References Cited

U.S. PATENT DOCUMENTS 3,389,563 A * 6/1968 Postlewaite ............. F16L 1/203
405/166
4,687,378 A * 8/1987 Jegousse ................. F16L 1/166
405/168.4
(Continued)

FOREIGN PATENT DOCUMENTS

GB     2510569       8/2014
KR     20130007312   12/2013
(Continued)

*Primary Examiner* — Benjamin F Fiorello
(74) *Attorney, Agent, or Firm* — MATTINGLY & MALUR, PC

(57) ABSTRACT

A method of converting a subsea laying system of a surface vessel from a laying mode to an abandonment or recovery mode includes clamping at least one tubular sleeve in at least one clamp of the laying system. A winch wire can then run longitudinally through the or each clamped sleeve when suspending an elongate subsea element such as a pipe string during abandonment or recovery operations. The sleeve protects gripping pads of the clamp from damage due to clashing with the wire and so makes it unnecessary to remove the pads in preparation for abandonment or recovery

43 Claims, 17 Drawing Sheets

(51) Int. Cl.
*F16L 1/24* (2006.01)
*F16L 3/02* (2006.01)
*F16L 9/02* (2006.01)
*F16L 13/02* (2006.01)

(52) U.S. Cl.
CPC ................ *F16L 1/24* (2013.01); *F16L 3/02* (2013.01); *F16L 9/02* (2013.01); *F16L 13/02* (2013.01)

(56) References Cited

U.S. PATENT DOCUMENTS

| | | | |
|---|---|---|---|
| 6,149,347 A * | 11/2000 | Scott | F16L 1/19 405/166 |
| 6,273,643 B1 | 8/2001 | Baugh | |
| 6,729,802 B2 | 5/2004 | Giovannini et al. | |
| 7,507,055 B2 * | 3/2009 | Smith | F16L 1/235 405/173 |
| 8,104,995 B2 | 1/2012 | Roodenburg et al. | |
| 8,764,345 B2 | 7/2014 | Ardavanis | |
| 8,950,977 B2 | 2/2015 | Cruickshank | |
| 9,664,307 B2 | 5/2017 | Cruickshank | |
| 9,671,042 B2 | 6/2017 | Mouchel et al. | |
| 10,221,966 B2 | 3/2019 | Bianchi et al. | |
| 2003/0099515 A1 * | 5/2003 | Giovannini | F16L 1/202 405/168.1 |
| 2011/0142543 A1 | 6/2011 | Griffin | |
| 2013/0051921 A1 * | 2/2013 | Chiodini | F16L 1/202 405/173 |
| 2014/0161535 A1 * | 6/2014 | Machado Guigon De Araujo | F16L 1/23 405/168.4 |
| 2014/0227923 A1 * | 8/2014 | Snyder, II | H02G 9/12 441/133 |
| 2015/0345275 A1 * | 12/2015 | Sathananthan | E02B 17/04 210/175 |
| 2022/0163138 A1 * | 5/2022 | D'Huart | F16L 1/207 |

FOREIGN PATENT DOCUMENTS

| | | |
|---|---|---|
| WO | WO 01/48410 | 7/2001 |
| WO | WO 2008/007945 | 1/2008 |
| WO | WO 2011/048480 | 4/2011 |
| WO | WO 2011/083340 | 7/2011 |
| WO | WO 2012/120381 | 9/2012 |
| WO | WO 2012/140631 | 10/2012 |

* cited by examiner

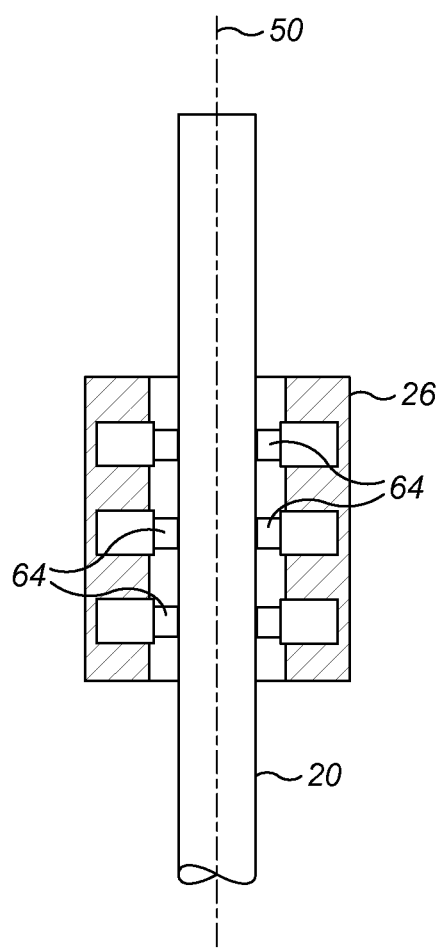
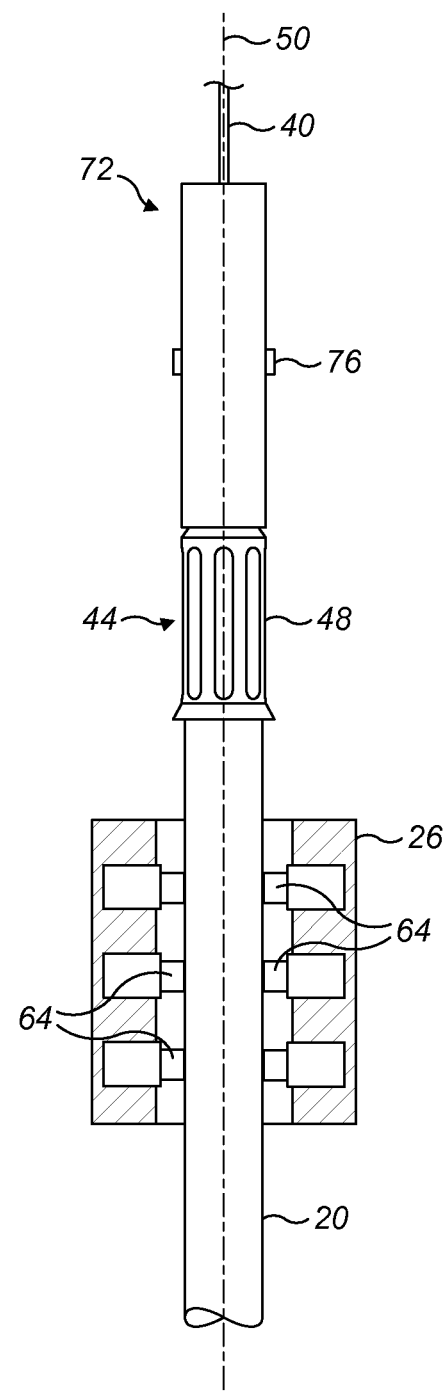
FIG. 9a
FIG. 9b

ABANDONMENT AND RECOVERY OF PIPELINES

This invention relates to abandonment and recovery operations used in marine pipelaying, involving the use of a floating vessel such as a barge to lay an offshore pipeline. Such pipelines are most commonly used in the production of oil and gas from subsea wells.

The invention aims to save time during pipeline abandonment especially. It has particular advantages when used with J-lay pipelaying equipment and so will be described in that context.

The J-lay technique involves welding together successive sections of rigid pipe or 'pipe joints' end-to-end in an upright orientation in a lay tower of a pipelaying vessel. The resulting pipe string is launched downwardly into the water as it is fabricated.

FIGS. 1 and 2 of the accompanying drawings are simplified schematic side views of a J-lay system of a conventional pipelay vessel 10, shown here floating on the sea 12 over a subsea installation site.

The hull 14 of the vessel 10 supports a lay tower 16 upstanding from a working deck 18. The lay axis along which a pipe string 20 is launched into the sea 12 is substantially vertical in this example. Commonly, however, although not shown here, the lay tower 16 may have a pivoting or gimballed mounting to the hull 14 so that the lay axis can depart by several degrees (for example up to 14.5°) from the vertical. References in this specification to 'vertical' or 'vertically' should be construed as to encompass such variations from true verticality.

The lay tower 16 supports an upper workstation 22 at an intermediate level, at which pipe joints 24 are welded successively to the top of the pipe string 20 that hangs into the sea 12 beneath the vessel 10. Before and during welding, the suspended weight of the pipe string 20 is held by a stationary friction clamp 26 that is positioned under the upper workstation 22.

The pipe joints 24 are made onshore and are stored horizontally on the working deck 18. Typically, each pipe joint has a nominal length of 12 m. To speed the pipelaying process, pipe joints 24 are commonly welded together end-to-end onshore or offshore to form double, triple or quad joints, which are a corresponding multiple of 12 m in nominal length. For simplicity, the following description will refer to single, double, triple or quad joints collectively as pipe joints 24.

As required, the pipe joints 24 are lifted successively from the deck and are loaded into a pivoting erector arm 28. The erector arm 28 upends each pipe joint 24 into an upright orientation as shown in FIG. 1, a process shown starting in FIG. 2, and passes the pipe joint 24 over to a tower handling system that comprises a travelling friction clamp 30.

The travelling clamp 30 is movable up and down the lay tower 16 along a track 32 above the stationary clamp 26. The stationary clamp 26 and the travelling clamp 30 can alternate to grip the pipe string 20, interacting in a so-called 'hand-over-hand' manner as the reciprocating travelling clamp 30 grips, lowers and releases the pipe string 20.

Initially, as shown in FIG. 1, the travelling clamp 30 is in an elevated position and holds an upper end of a pipe joint 24 upended by the erector arm 28. The travelling clamp 30 then moves a short distance down the track 32 to lower and align the lower end of the pipe joint 24 with the upper end of the pipe string 20 held in the stationary clamp 26.

Next, the pipe joint 24 is welded to the upper end of the pipe string 20 at the upper workstation 22, hence extending the pipe string 20 by the length of that pipe joint 24. Then, the stationary clamp 26 is opened to transfer the load of the pipe string 20 from the stationary clamp 26 to the travelling clamp 30. The travelling clamp 30 then moves further down the track 32 to lower the new upper end of the pipe string 20 to the level of the upper workstation 22, ready for the addition of the next pipe joint 24 to the pipe string 20.

In this respect, FIG. 2 shows the stationary clamp 26 open and the travelling clamp 30 moving down the lay tower 16 along the track 32 to lower the pipe string 20. When the travelling clamp 30 reaches the bottom of its travel, the stationary clamp 26 is closed to take the weight of the pipe string 20 and the travelling clamp 30 is opened and returned to its upper position.

When the travelling clamp 24 has lowered the extended pipe string 20 in this way, the welded joint between the newly-added uppermost pipe joint 24 and the remainder of the pipe string 20 comes into alignment with a lower workstation 34, shown here at the level of the working deck 18. There, the welded joint is coated for corrosion protection and thermal insulation before being launched into the sea during the next cycle of hand-over-hand operation of the clamps 26, 30.

A hang-off system 36 disposed under the lower workstation 34 can support the weight of the pipe string 20 when inserting an accessory into the pipe string 20.

The lay tower 16 also supports a winch system that comprises a winch 38 and one or more cables or wires 40 that extend from the winch 38 over a sheave 42 at the top of the lay tower 16. The winch system can be used to support and move the travelling clamp 30 and can also be used to support the pipe string 20 during abandonment and recovery (A&R) operations.

Abandonment and recovery refer, respectively, to laying down a pipeline end on the seabed and later, if required, retrieving the pipeline end from the seabed. Those operations are necessary during normal pipelaying start-up and termination. They are also necessary whenever pipelaying must be interrupted, for example due to deteriorating weather conditions. In this respect, pipelaying in bad weather may stress the pipeline and reduce its fatigue life as the vessel 10 rolls and pitches in a rough sea or has difficulty maintaining its position due to winds and currents. In such cases, the vessel 10 may need to abandon the pipeline end and leave the work area or remain on station at the surface, before eventually recovering the pipeline end to resume pipelaying when conditions improve.

Abandonment involves attaching a cap or fixing to the upper end of the pipe string 20 for securing an A&R wire 40 of the winch 38 to the pipe string 20 via a shackle or a hook. For example, plug-like gripper fixings known in the art for lifting pipes are supplied under the registered trade marks BALLTEC and BALLGRAB by Balltec Ltd. and First Subsea Ltd. respectively. Such fixings fit into, and lock within, the open end of the pipe string 20 using a ball-and-taper mechanism and can be released and reinserted subsea. Alternatively, but less preferably, a cap with a shackle or a hook may be welded onto the upper end of the pipe string 20 for abandonment and subsequently cut away from the pipe string 20 following recovery.

When the A&R wire 40 has been secured to the pipe string 20 via a fixing or cap, tension is transferred from the stationary clamp 26 or the travelling clamp 30 of the lay tower 16 to the winch 38. The winch 38 then lowers the pipe string 20 into the sea 12 until the pipe string 20 rests fully on the seabed. The A&R wire 40 and any removable fixing is then detached from the pipe string 20, for example using a remote-controlled linkage or an ROV, and is retracted back to the vessel 10 by the winch 38.

A recovery buoy may be attached to the pipe string 20 during abandonment, enabling the pipeline end to be located and retrieved during a subsequent recovery operation. In essence, the recovery operation is the reverse of abandonment as the A&R wire 40 is reattached to the pipe string 20, typically using an ROV, and then the pipe string 20 is winched back up to the vessel 10 for pipelaying to resume.

If the vessel 10 can remain on station above the abandoned pipe string 20 while riding out a period of bad weather, the A&R wire 40 may be kept attached to the pipe string 20 resting on the seabed until the weather improves. This eases the recovery operation.

WO 2001/048410 describes an abandonment method that uses an A&R wire to suspend a pipeline from a winch of a pipelay vessel. Relative motion between the vessel and the suspended pipeline can cause the A&R wire to clash with and damage fragile gripping elements or pads of the clamps in the lay tower. The risk of clashing is increased if the lay tower is tilted from the vertical.

One approach to avoid clashing with an A&R wire is to displace a pipe-gripping mechanism away from the firing line or lay axis, for example by swinging a tensioner aside as is taught by WO 2008/007945. This approach works well for a tensioner because the tracks of the tensioner can be moved apart and displaced independently. However, it is not possible to adopt this approach when the gripping mechanism is too heavy or, like a friction clamp, does not comprise structural elements that can be moved away from the lay axis.

Another approach to avoid clashing with an A&R wire is to convert or reconfigure a lay tower from a pipelay mode into an A&R mode. This involves removing the pads or other gripping elements from one or both of the clamps in the lay tower before an abandonment or recovery operation can begin. For example, the travelling clamp is lowered to the upper workstation, at which the pads are removed individually before the travelling clamp is sent back to the top of the lay tower. The A&R wire is then deployed through the travelling clamp. All of these steps must be reversed when returning the lay tower to the pipelay mode.

By way of example, a travelling clamp may have eighteen pads that weigh about 80 kg each. Care must be taken not to damage the pads while removing and replacing them. Removing or replacing so many fragile and heavy components introduces safety challenges and takes a long time, typically eight to ten hours, especially if the lay tower is inclined at a substantial angle to the vertical. Such a delay will be multiplied if, as is common, a pipelaying campaign involves multiple transitions between the pipelay and A&R modes.

Delays are undesirable because pipelaying vessels are valuable capital assets that rely upon the availability of a limited weather window and are extremely expensive to operate. Also, if abandonment is necessitated by the threat of bad weather, the abandonment operation should be completed as quickly as possible before the weather deteriorates.

Yet another approach to avoid clashing with an A&R wire is to replace the A&R wire with a tensile member that has a similar diameter to the pipeline. This enables the tensile member to be held back by the same mechanism that grips the pipeline, such as a clamp system as shown in FIGS. 1 and 2. The tensile member may be a 'dummy pipe' such as a sacrificial extension to the pipeline or a flexible pipeline as taught by WO 2012/120381. Alternatively, the tensile member may comprise a series of purposely-designed tensile elements as are disclosed in WO 2011/083340.

Length-for-length, tensile members such as dummy pipes are more expensive than A&R wire and may not be appropriate for abandonment in deep water because of their weight and cost. Additionally, a winch can support more weight than a gripping mechanism such as a tensioner or a clamp. Also, once abandonment has begun, a winch can lower a pipe string in a quick, continuous operation rather than the intermittent, stepwise movement of friction clamps operating hand-over-hand.

In a hybrid approach, WO 2012/140631 teaches the use of adaptor belts mounted on tracks of a tensioner. The adaptor belts modify the gripping diameter of the tensioner to grip an A&R wire and also allow the tensioner to contribute additional hold-back force to the hold-back force provided by a winch. However, the adaptor belts take considerable time to install and are not suitable for friction clamps.

Against this background, the invention provides a method of converting a subsea laying system of a surface vessel from a laying mode to an abandonment or recovery mode. The method comprises: clamping at least one tubular sleeve in at least one clamp of the laying system; and running a wire longitudinally through the or each clamped sleeve to suspend an elongate subsea element, such as a pipe string, during abandonment or recovery.

For example, the elongate subsea element may be lowered by running the wire through the or each clamped sleeve in a first direction and/or raised by running the wire through the or each clamped sleeve in an opposing second direction.

The clamped sleeve may protect the clamp from the wire as the wire runs through the clamp during abandonment or recovery. In this way the elongate subsea element can be lowered and/or raised while supported by the wire with reduced risk of the wire causing damage to the clamp.

Conveniently, the sleeve may be placed onto, and supported by, an upper end of the elongate subsea element before the sleeve is clamped. A buffer component such as a cap may be interposed at an interface between the sleeve and the upper end of the elongate subsea element.

The sleeve may, advantageously, self-align with the elongate subsea element along a common longitudinal axis as a consequence of being lowered onto the elongate subsea element. For example, the upper end of the elongate subsea element may be inserted into a lower end of the sleeve, such as a radially-enlarged skirt at the lower end of the sleeve. The skirt may be enlarged relative to a body portion of the sleeve, which body portion suitably has an outer diameter substantially the same as that of the elongate subsea element. A shoulder at an upper end of the skirt may seat onto the upper end of the elongate subsea element.

Relative vertical movement between the sleeve and the clamp may take place before clamping the sleeve in the clamp. For example, the clamp may be lowered into alignment with the sleeve supported by the elongate subsea element. In that case, the clamp may be a travelling clamp that is movable up and down along a lay tower. The clamped sleeve may subsequently be lifted by the clamp away from the upper end of the elongate subsea element.

In another approach, the sleeve supported by the elongate subsea element may be lowered into alignment with the clamp. In that case, the clamp may be a stationary or static clamp of a lay tower.

The wire may be lowered into the sleeve and then coupled to the elongate subsea element. Coupling may take place within the sleeve, in which case the wire may conveniently be accessed or viewed through a wall of the sleeve. The wire may instead be coupled to the elongate subsea element underwater, in particular as a precursor to a recovery operation.

The method of the invention may include preliminary steps of suspending the sleeve and lifting the suspended sleeve into alignment with the clamp.

A variant of the method, used to protect more than one clamp of the laying system, may involve clamping a first tubular sleeve in a first clamp of the laying system; clamping a second tubular sleeve in a second clamp of the laying system; and running the wire longitudinally through the clamped first and second sleeves to suspend the elongate subsea element for abandonment or recovery.

This variant may comprise: effecting relative vertical movement between the second sleeve and the second clamp; clamping the second sleeve in the second clamp; effecting relative vertical movement between the first sleeve and the first clamp; and clamping the first sleeve in the first clamp. For example, the second clamp may be lowered into alignment with the second sleeve before clamping the second sleeve in the second clamp; and the first sleeve may be lowered into alignment with the first clamp before clamping the first sleeve in the first clamp.

The first and second sleeves may be placed together onto the upper end of the elongate subsea element. Conveniently, the second sleeve may rest on the first sleeve when they are placed together onto the upper end of the elongate subsea element. Subsequently, the first sleeve may be separated from the second sleeve, for example by lowering the first sleeve supported by the elongate subsea element into alignment with the first clamp. This may, for example, involve telescopic relative movement between the first and second sleeves.

The first and second sleeves may initially be locked together. When placed together onto the upper end of the elongate subsea element, the first and second sleeves may than be unlocked from each other to permit their separation.

The inventive concept extends to a sleeve for use in protecting gripping elements of a clamp of a subsea laying system. The sleeve comprises: a tubular body portion; a tubular skirt on an end of the body portion, aligned with the body portion along a common longitudinal axis to define a lumen that extends continuously along the sleeve through the body portion and the skirt; and an internal seating formation in the lumen between the body portion and the skirt.

The seating formation may be defined by a narrowing of the lumen. For example, the seating formation may be a step between the skirt and the body portion. The seating formation may be frusto-conical and may taper from the skirt to the body portion.

The skirt is preferably enlarged radially relative to the body portion. In that case, the skirt suitably has an internal diameter that is greater than the external diameter of the body portion.

A flared guide formation may be disposed at a free end of the skirt, to guide the sleeve onto an elongate subsea element such as a pipe string.

A wall defining the body portion may be penetrated by one or more access apertures that are offset longitudinally toward a junction between the body portion and the skirt. Similarly, a wall defining the skirt may be penetrated by one or more slots that extend longitudinally along the skirt.

A second, auxiliary sleeve may be mounted on the body portion, for example being positioned around the body portion or on a free end of the body portion. At least one releasable fastening may act between the sleeve and the auxiliary sleeve.

The sleeve of the invention may be used in combination with an interface cap that has an outer side shaped to complement the internal seating formation and an inner side shaped to receive an end of an elongate subsea element such as a pipe. For example, the outer side of the cap may have a chamfered edge whose inclination substantially corresponds to inclination of the seating formation of the sleeve relative to the longitudinal axis The inner side of the cap may be surrounded by a longitudinally-extending peripheral formation that is arranged to encircle or embrace the end of the elongate subsea element. The cap may further comprise a resilient component on an radially inner side of the peripheral formation.

The cap is suitably penetrated by a central opening whose diameter may be less than the inner diameter of the peripheral formation. This defines an annular bearing surface that suitably extends in a plane between the central opening and the peripheral formation.

The invention has been devised to work around the limitations of the prior art and to allow abandonment of a pipeline catenary by the abandonment winch and wire method, while preventing damage to the pipe-gripping mechanism of a pipelay vessel.

Specifically, the invention has arisen from a requirement to protect the pads in the travelling friction clamp of a J-lay tower when an A&R wire is deployed and recovered through that clamp. Before the invention, the pads had to be removed one-by-one before A&R wire deployment and re-installed one-by-one after A&R wire recovery. The invention avoids the need to remove the pads before A&R wire deployment and hence avoids the need to re-install the pads after A&R wire recovery. This allows a safer and much less time-consuming operation when changing between pipelay mode and A&R mode, and vice versa.

In the invention, a pipe string, a catenary or a dummy pipe is clamped by a stationary working friction clamp and used as a support on which to land a protective sleeve of the invention. The travelling friction clamp is then lowered around the sleeve and recovers the sleeve by clamping it.

Embodiments of the invention provide an interface sleeve for use when abandoning the second, upper or trailing end of a subsea pipeline being laid on the seabed. The sleeve, which may be of steel, comprises an elongated body having substantially the same diameter as the pipeline. The body, which may be a cylinder, comprises a longitudinal bore or lumen and a mount to couple the sleeve to the second end of the pipeline. The mount suitably has a greater diameter than the body.

The sleeve is typically used in a substantially vertical or upright orientation, for example in a J-lay tower.

The outer surface of the body may be prepared or coated to increase frictional engagement with the pipe-gripping mechanism of the pipelay vessel.

The mount may comprise a centring sleeve or skirt and an interface. The interface may be a diameter restriction so that the body lies on the pipeline end and is held there by gravity when the sleeve is upright. The centring sleeve may be elongated longitudinally to prevent the body tilting relative to the pipeline end.

The centring sleeve may comprise windows such as slots to decrease weight, and may further comprise a funnel-like guide formation to ease coupling with the second end of the pipeline.

Embodiments of the invention also implement a method to abandon a subsea pipeline on the seabed. In that method, when the last end of the pipeline is held by the gripping mechanism of a lay system, a longitudinally hollow interface sleeve is mounted on that end of the pipeline. The sleeve comprises a mount and a body with substantially the same diameter as the pipeline.

An abandonment wire is passed through a bore of the interface sleeve and connected to the last end of the pipeline. After the weight of the suspended pipeline is transferred from the gripping mechanism to the abandonment wire, the suspended pipeline is lowered until the body of the interface sleeve is inside the gripping mechanism. The body of the interface sleeve can then be gripped by the gripping mechanism before resuming abandonment of the pipeline by the wire, with the wire running through the interface sleeve.

In another approach, a gripping mechanism may be lowered until the body of the interface sleeve is inside and gripped by the gripping mechanism. Then, the pipeline suspended on the wire may be abandoned as the wire runs through the interface sleeve.

In summary, the invention provides a method of converting a subsea laying system of a surface vessel from a laying mode to an abandonment or recovery mode. The method comprises clamping at least one tubular sleeve in at least one clamp of the laying system. A winch wire may then run longitudinally through the or each clamped sleeve when suspending an elongate subsea element, such as a pipe string, during abandonment or recovery operations. The sleeve protects gripping pads of the clamp from damage due to clashing with the wire, and so makes it unnecessary to remove the pads in preparation for abandonment or recovery.

Thus, the invention obviates the requirement for pads to be removed from or replaced into the clamps of a lay tower when switching between pipelay and A&R modes. There is minimal handling, involving just one lift of the protective sleeve. This improves safety and shortens the conversion operation drastically, for example to just two hours or less. As much as a full day may therefore be saved in a typical pipelaying campaign that involves four transitions from pipelay mode to A&R mode and back again. This could save hundreds of thousands of dollars of operational costs of a pipelay vessel.

To put the invention into context, reference has already been made to FIGS. 1 and 2 of the accompanying drawings. In those drawings:

FIG. 1 is a simplified schematic side view of a conventional J-lay system of a pipelay vessel, shown here adding a pipe joint to the top of a pipe string suspended from the vessel; and FIG. 2 corresponds to FIG. 1 but shows the pipe string being lowered into the sea after the additional pipe joint has been welded to the top of the pipe string.

In order that the invention may be more readily understood, reference will now be made, by way of example, to the remaining drawings in which:

FIGS. 9a to 9e are a sequence of schematic part-sectional side views that show how the sleeve variant of FIGS. 7 and 8 may be used to protect both a travelling clamp and a stationary clamp of a J-lay system during A&R operations;

Figure 3:
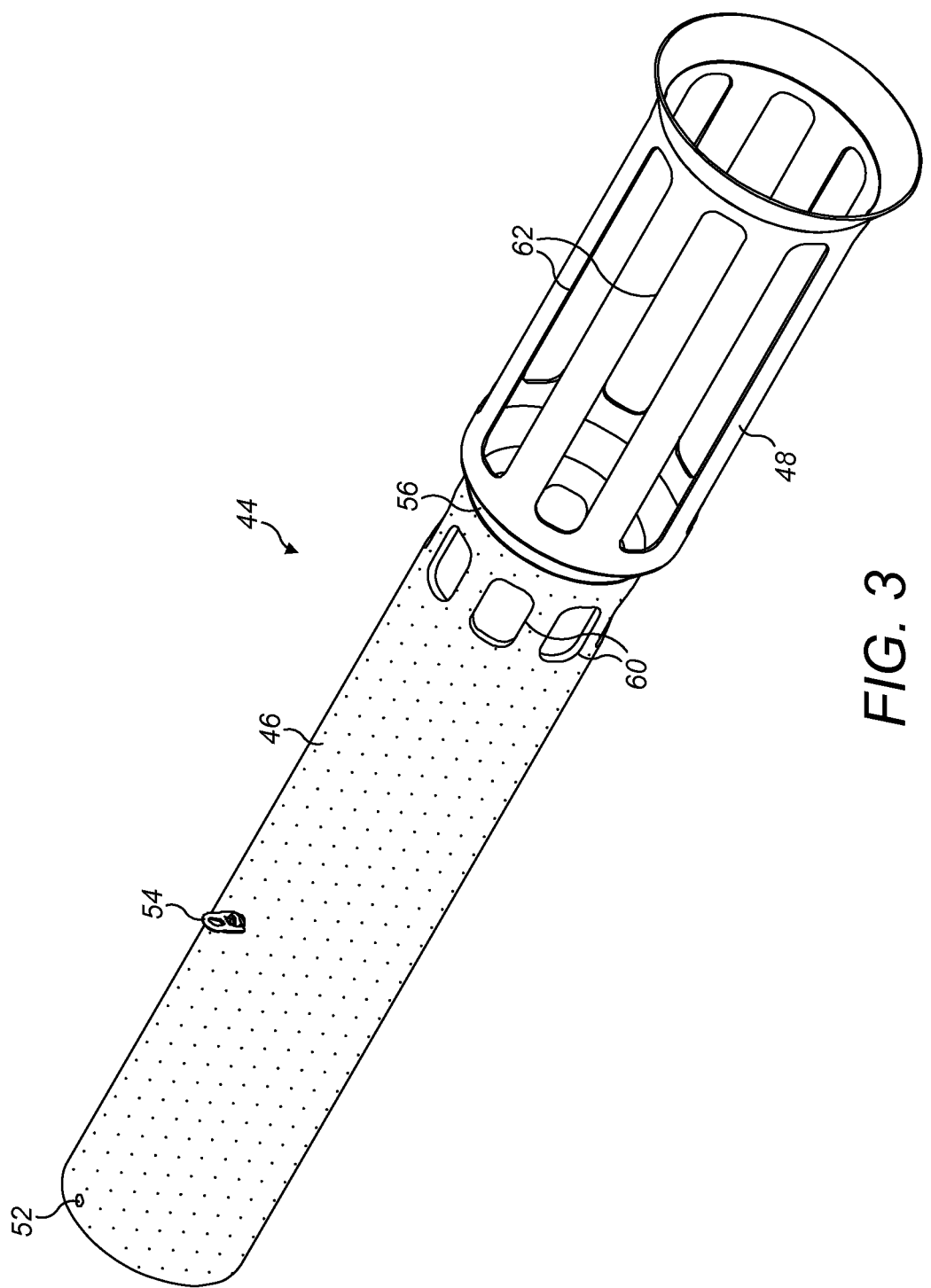
FIG. 3 is a perspective view of a protective sleeve of the invention.
Figure 4:
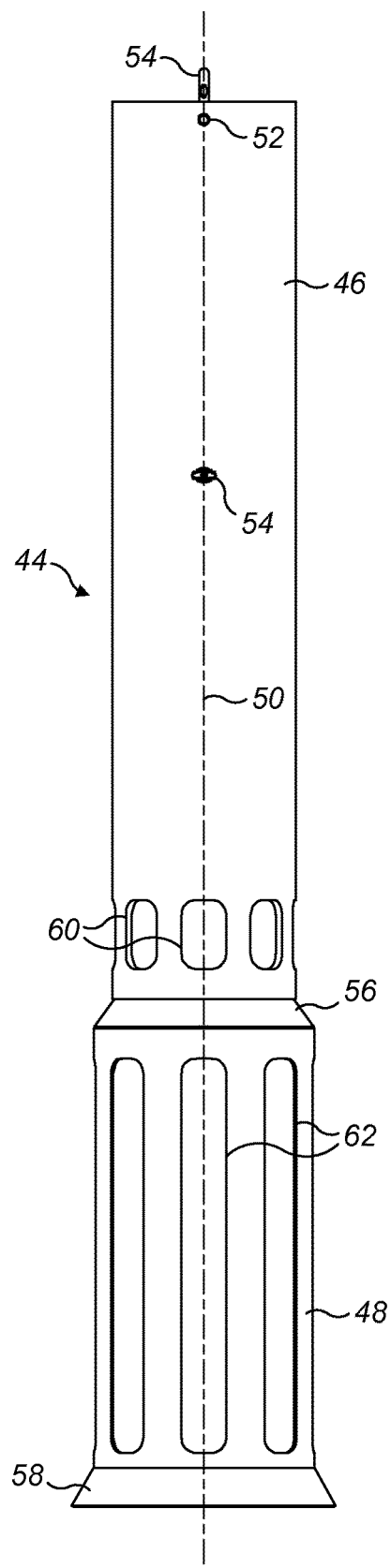
FIG. 4 is a side view of the sleeve shown in FIG. 3.

Referring firstly to FIGS. 3 and 4, these drawings show a protective sleeve 44 of the invention. The sleeve 44 could be of any suitable material but is conveniently fabricated from rolled steel plate or from short lengths of pipe.

The sleeve 44 comprises a tubular body portion 46 and a tubular skirt 48 that is welded to one end of the body portion 46. The body portion 46 and the skirt 48 share a common central longitudinal axis 50. The outer surface of the body portion 46, at least, may be coated, textured or shaped to maximise grip of the friction clamps 26, 30 shown in FIGS. 1 and 2. The body portion 46 also comprises lifting holes 52 into which removable shackles 54 may be fitted for attaching lifting straps to lift and manipulate the sleeve 44.

The body portion 46 and the skirt 48 are each substantially straight and are each of substantially constant external diameter along their length. The body portion 46 is suitably of a similar outer diameter to a pipe string 20 with which the sleeve 44 will be used during A&R operations, as will be explained. However, the skirt 48 is wider than the body portion 46. Preferably the skirt 48 has an internal diameter that is greater than the outer diameter of the body portion 46.

A frusto-conical step or shoulder 56 effects a transition in the width of the sleeve 44 between the narrower body portion 46 and the wider skirt 48. A frusto-conical outwardly-flared guide formation 58 surrounds the open end of the skirt 48 opposed to the shoulder 56.

The body portion 46 is penetrated by a circumferential array of apertures 60. The apertures 60 are angularly spaced around the circumference of the body portion 46 and are offset longitudinally toward the skirt 48, to a position close to the shoulder 56 between the body portion 46 and the skirt 48. The skirt 48 is similarly penetrated by a circumferential array of longitudinally-extending slots 62 that are angularly spaced around the circumference of the skirt 48. The slots 62 and the apertures 60 reduce the weight of the sleeve 44 and provide visual and physical access to the interior of the body portion 46 and the skirt 48.

Figure 1:
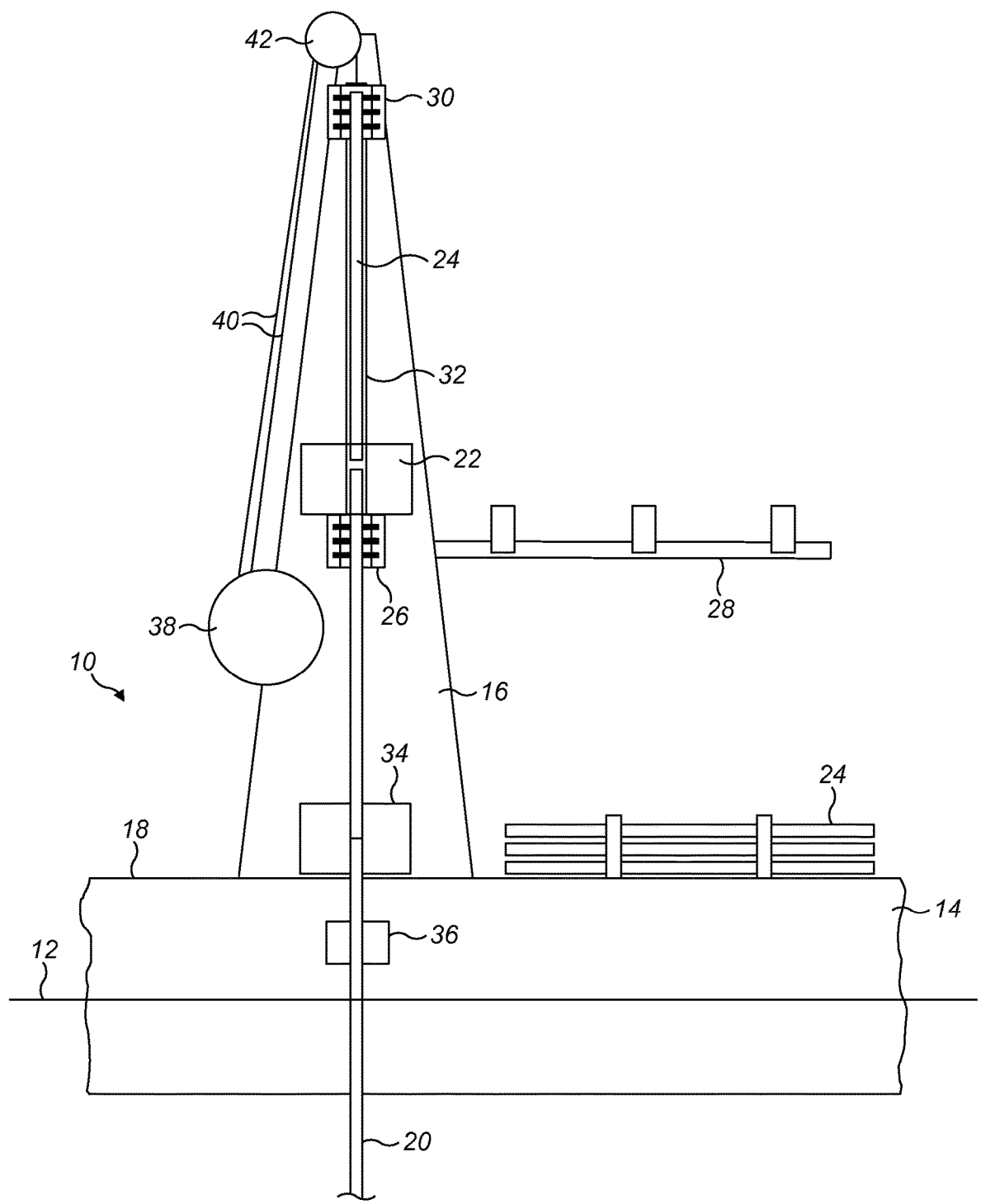
Figure 2:
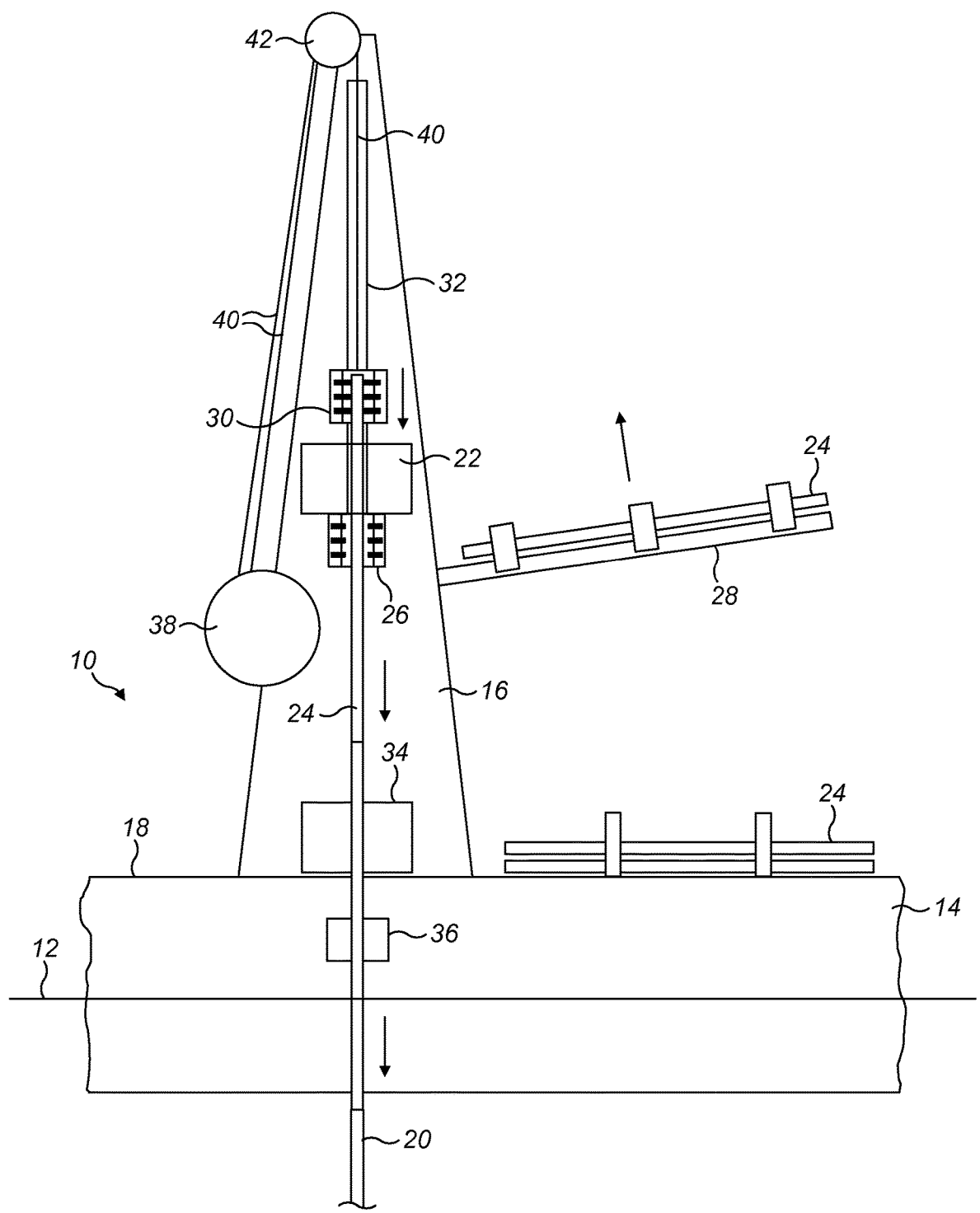

A sleeve 44 of the invention may be used in various ways to protect either or both of the friction clamps 26, 30 shown in FIGS. 1 and 2 from damage due to clashing with an A&R wire 40. The A&R wire 40 extends longitudinally within, along and through the sleeve 44. The body portion 46 of the sleeve 44 lies radially inwardly of, and hence protects, the pads or other gripping elements of the clamp 26, 30 in which the sleeve 44 is held. This obviates the need to remove the pads or other gripping elements from the clamp 26, 30 in preparation for A&R operations, which ensures safety and saves time.

FIGS. 5a to 5d show how the sleeve 44 may be used to protect the travelling clamp 30. In this respect, the travelling clamp 30 is typically at greater risk of damage from an A&R wire 40 than the stationary clamp 26. For example, the pads of the stationary clamp 26 may be retracted radially to a greater extent than the pads of the travelling clamp 30 to allow more clearance around the A&R wire 40. Also, the sides of an opening on the launch axis in an enclosure surrounding the upper workstation 22 may serve to limit deflection of the A&R wire 40 through the stationary clamp 26.

Figure 5A:
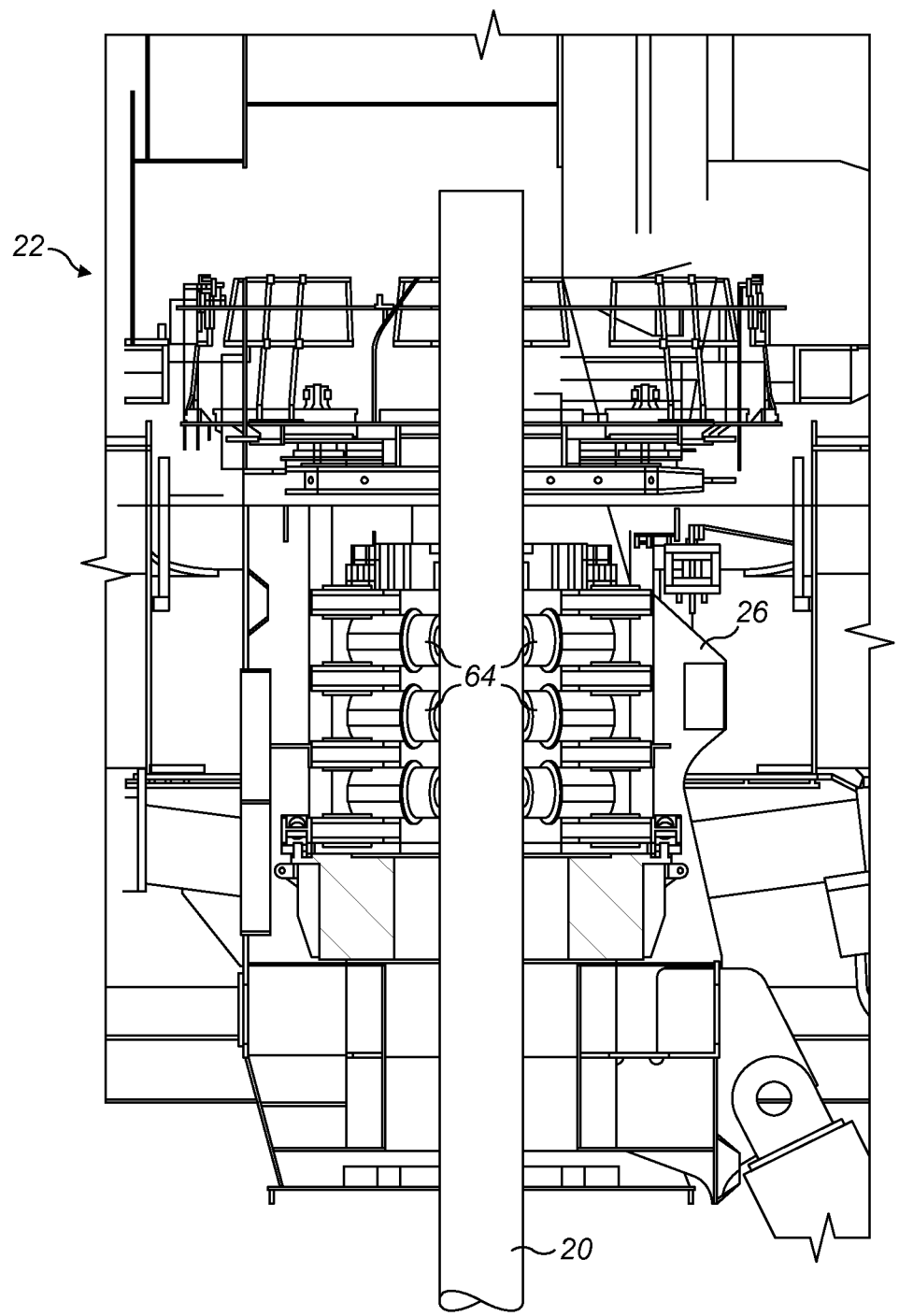
FIGS. 5a to 5d are a sequence of part-sectional side views of a workstation of a J-lay system at which pipe joints are welded to the top of a pipe string, showing how the sleeve of FIGS. 3 and 4 may be used to protect a travelling clamp of the system during A&R operations.

FIG. 5a shows an upper end portion of a pipe string 20 held by the stationary clamp 26 under the upper workstation 22. Pads 64 of the stationary clamp 26 are shown here extended radially inwardly into clamping engagement with the pipe string 20. The upper extremity of the pipe string 20 extends above the stationary clamp 26 into the upper workstation 22.

Figure 5B:
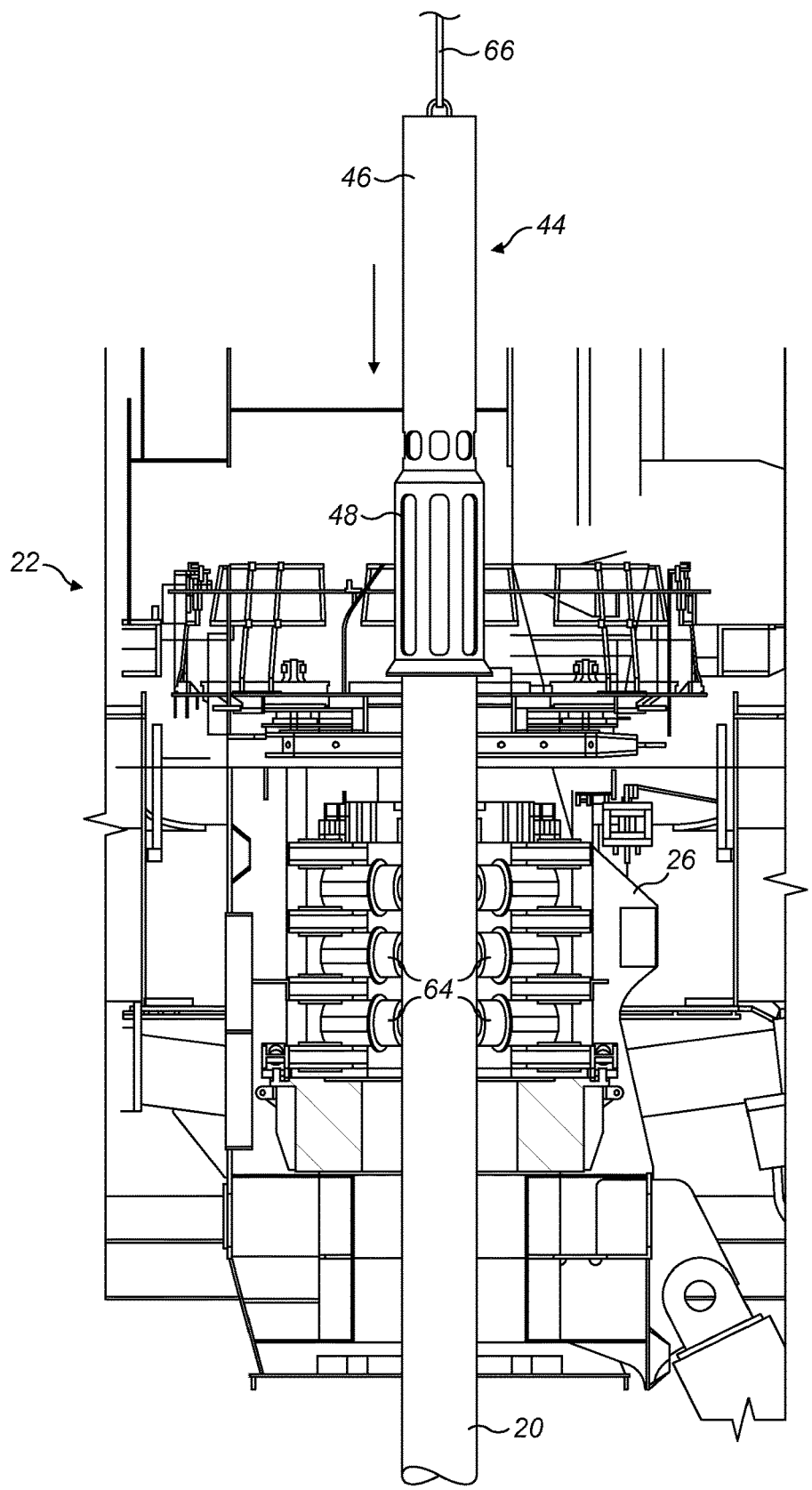

FIG. 5b shows the sleeve 44 lowered onto the protruding upper end of the pipe string in the upper workstation 22. The sleeve 44, shown here suspended from a lifting strap 66, is held in a substantially vertical orientation with the body portion 46 disposed above the skirt 48.

With the assistance of the flared guide formation 58 shown in FIGS. 3 and 4, the skirt 48 of the sleeve 44 receives the upper end of the pipe string 20. The upper end of the pipe string 20 extends as far into the sleeve 44 as is allowed by the shoulder 56 between the skirt 48 and the body portion 46. This engagement seats the sleeve 44 on the upper end of the pipe string 20 via the tapering shoulder 56, which serves as an internal seating formation that cooperates with the skirt 48 to align the sleeve 44 with the pipe string 20. The lifting strap 66 is then detached from the body portion 46 of the sleeve 44.

Figure 5C:
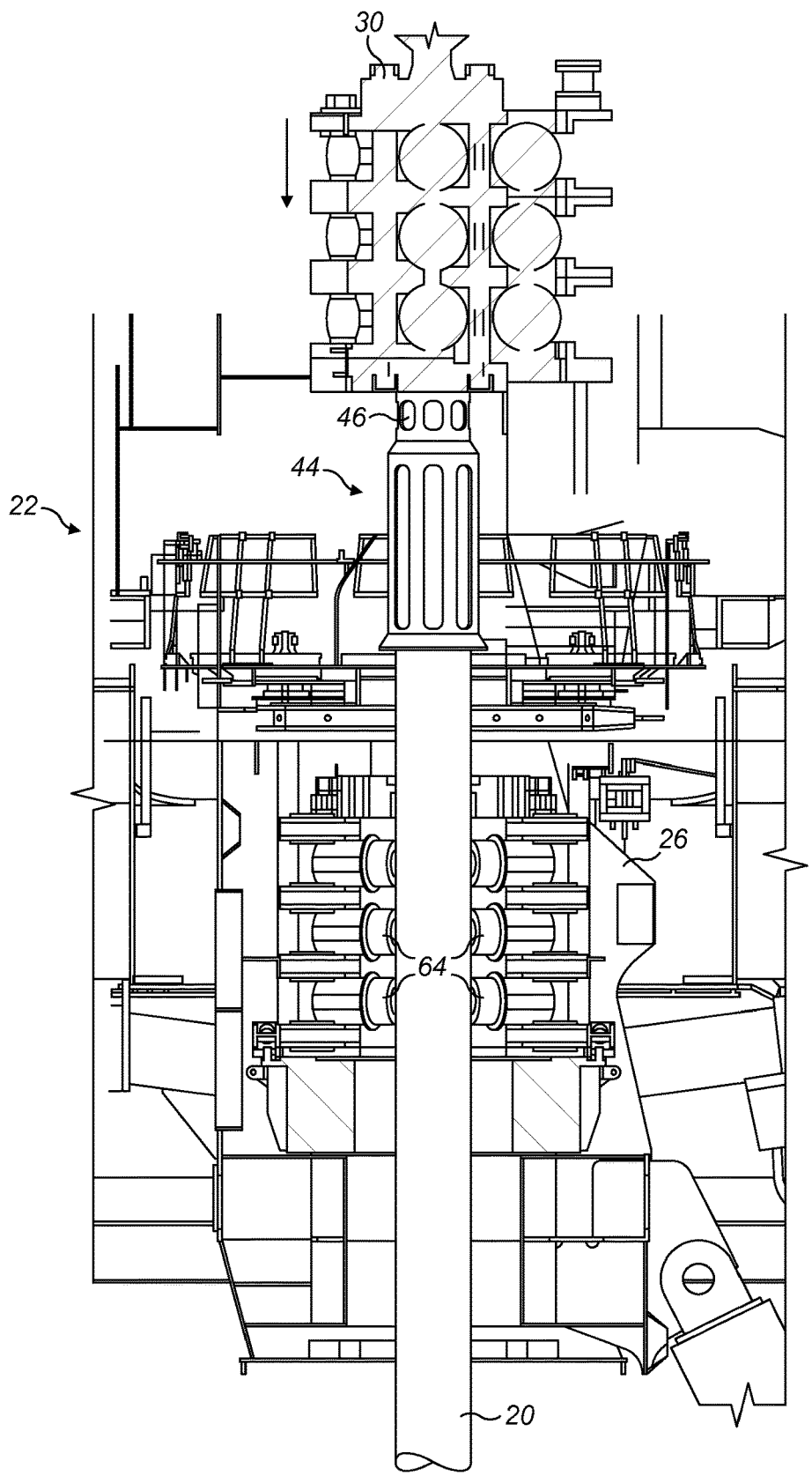

Next, as shown in FIG. 5c, the travelling clamp 30 is lowered to surround the body portion 46 of the sleeve 44 that extends upwardly from the upper end of the pipe string 20. The travelling clamp 30 is then activated to clamp the body portion 46.

Optionally, after engaging the sleeve 44, the travelling clamp 30 may be lifted away from the upper workstation 22 and the stationary clamp 26. This will pull the sleeve 44, which remains fixed within the travelling clamp 30, off the upper end of the pipe string 20.

The stationary clamp 26 must continue to support the weight of the pipe string 20, as shown in FIG. 5c, until that load has been transferred to an A&R wire 40 that extends through the sleeve 44 in the travelling clamp 30.

Figure 5D:
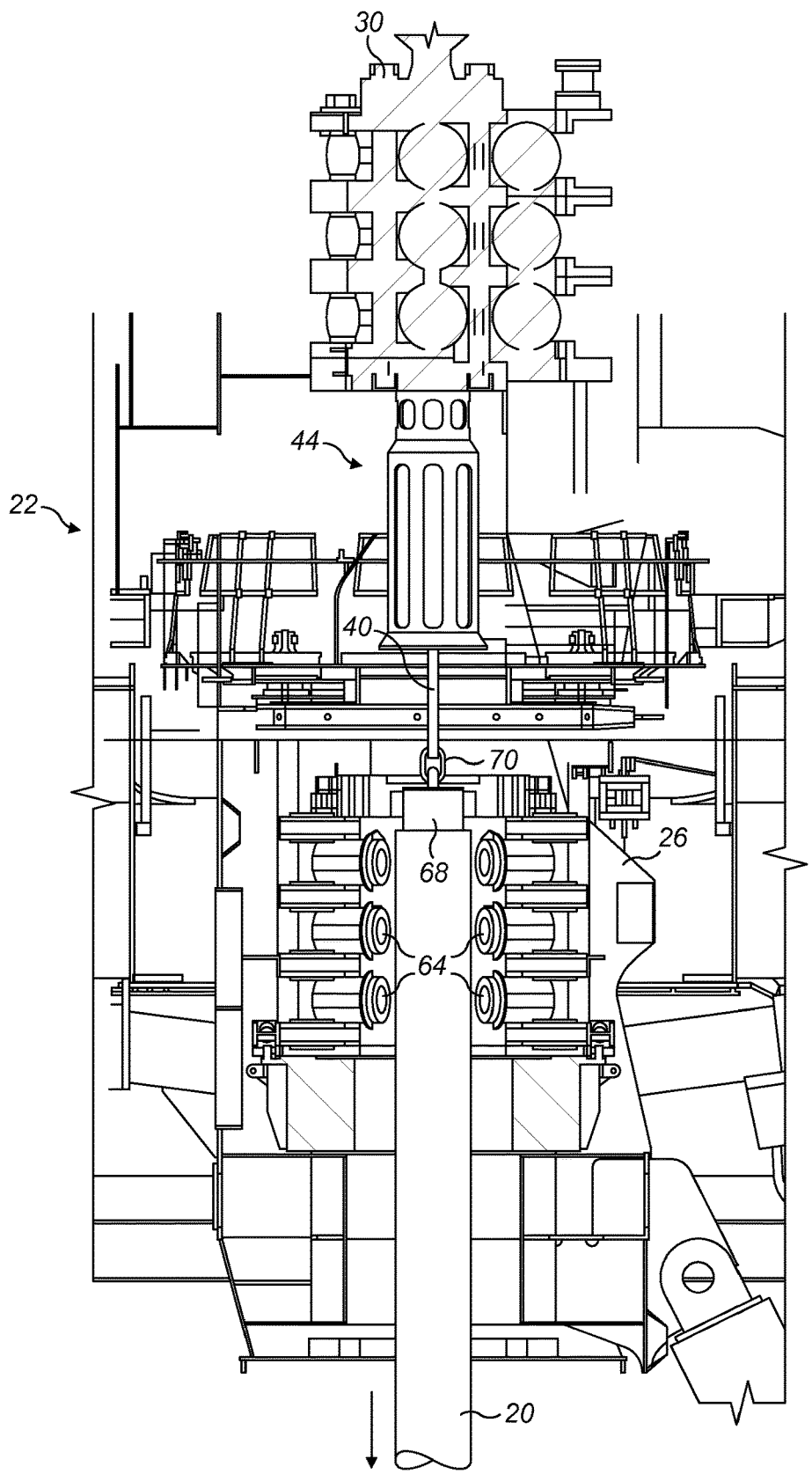

It can be seen in FIG. 5d that the A&R wire 40 extends through the central lumen of the sleeve 44 in the travelling clamp 30 to a lifting fixing 68 that is locked into, and protrudes from, the open upper end of the pipe string 20. The lifting fixing 68 comprises a shackle 70 for attaching the A&R wire 40.

In FIG. 5d, the pads 64 of the stationary clamp 26 have been retracted radially outwardly away from the pipe string 20. This releases the pipe string 20 to transfer the suspended weight of the pipe string 20 to the A&R wire 40. The pipe string 20 can then be lowered on the A&R wire 40 through and beyond the stationary clamp 26 for abandonment as shown.

The lifting fixing 68 may be inserted into the upper end of the pipe string 20 before or after the sleeve 44 is lowered onto the pipe string 20 as shown in FIG. 5b. Additionally, the A&R wire 40 may be attached to the lifting fixing 68 before or after the lifting fixing 68 is engaged with the pipe string 20. The slots 62 and apertures 60 of the sleeve 44 shown in FIGS. 3 and 4 provide access to make and to check the necessary connections.

Figure 6A:
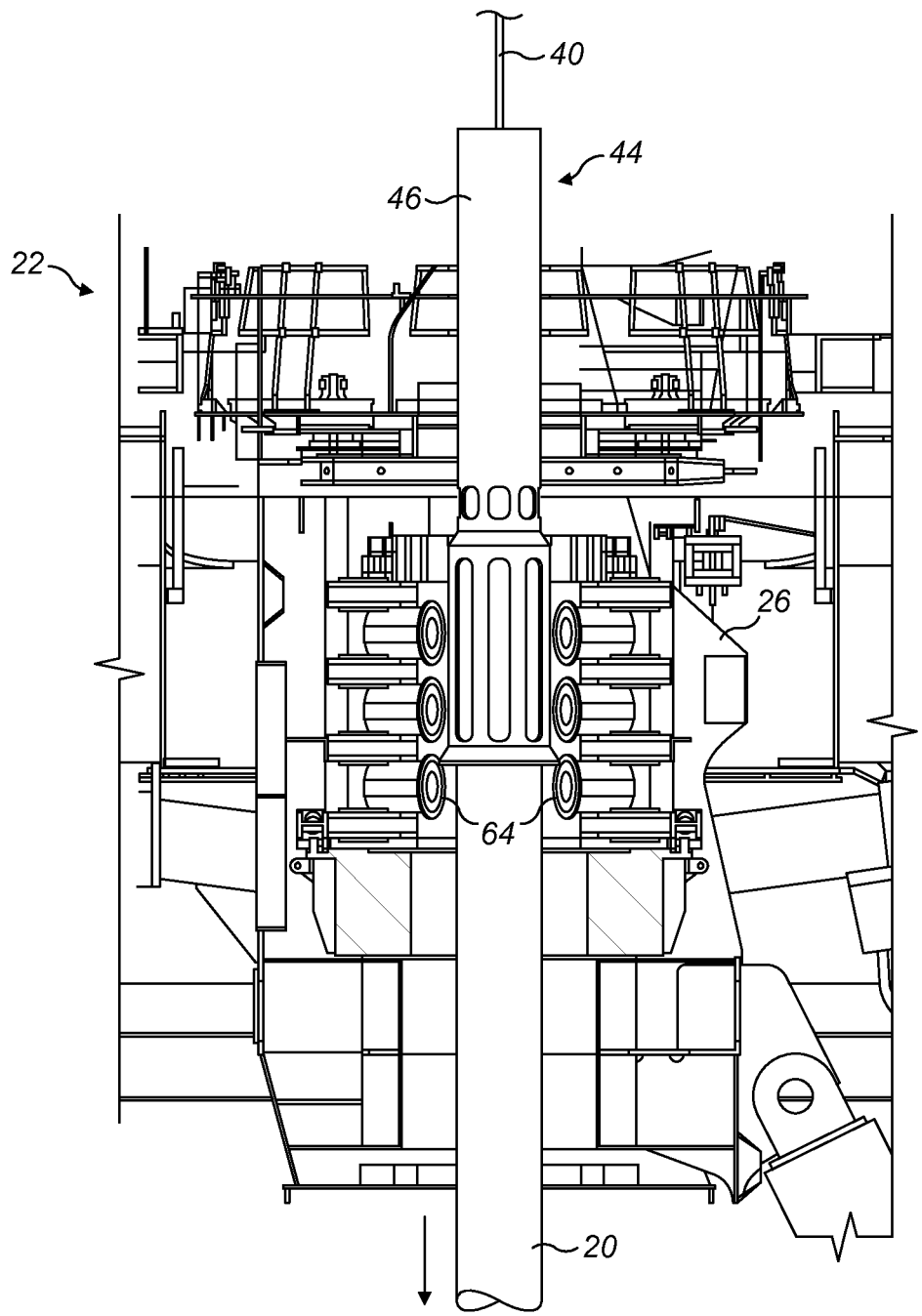
FIGS. 6a to 6c are a sequence of part-sectional side views of the workstation shown in FIGS. 5a to 5d, showing how the sleeve of FIGS. 3 and 4 may be used to protect a stationary clamp of the J-lay system during A&R operations.
Figure 6B:
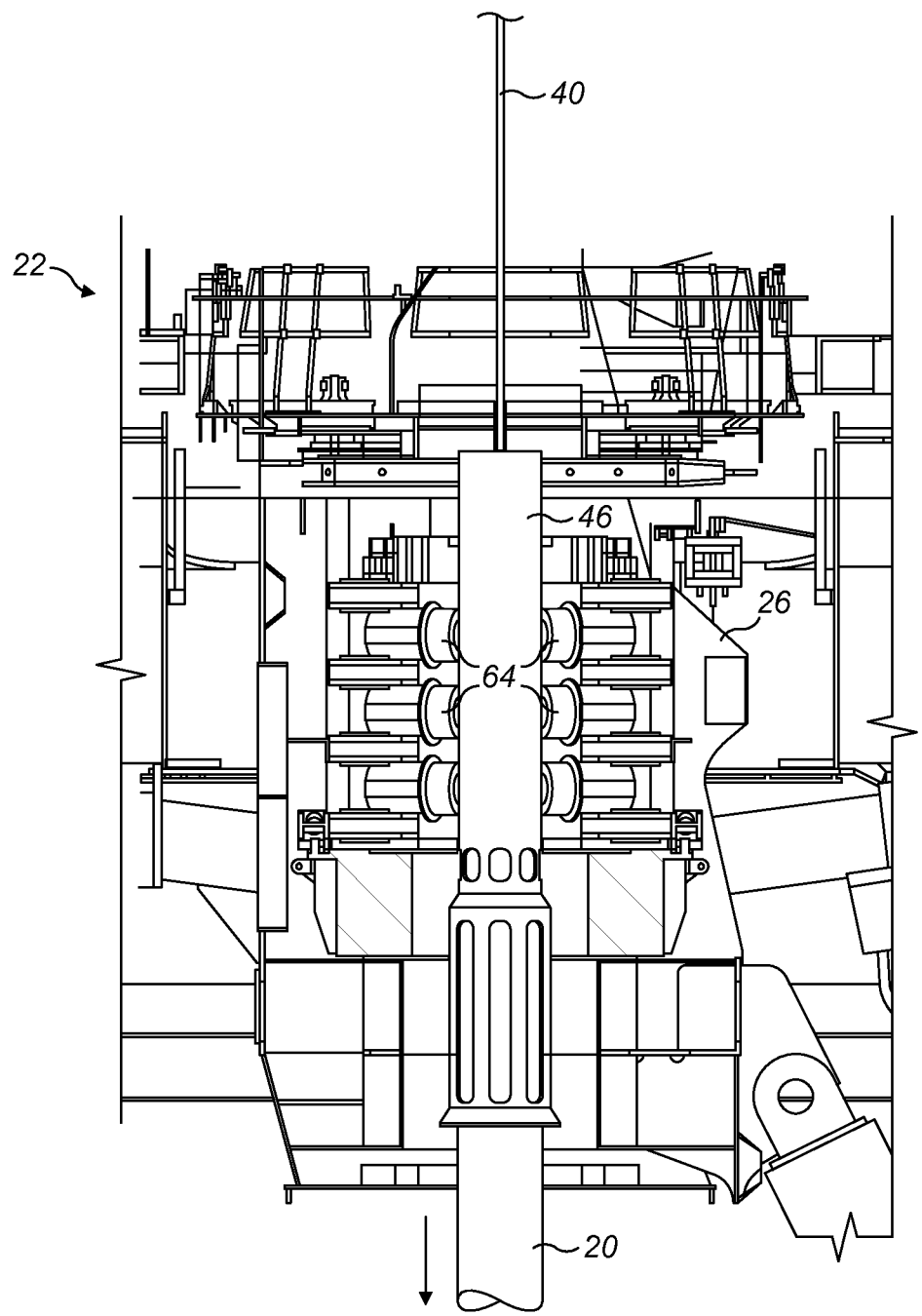
Figure 6C:
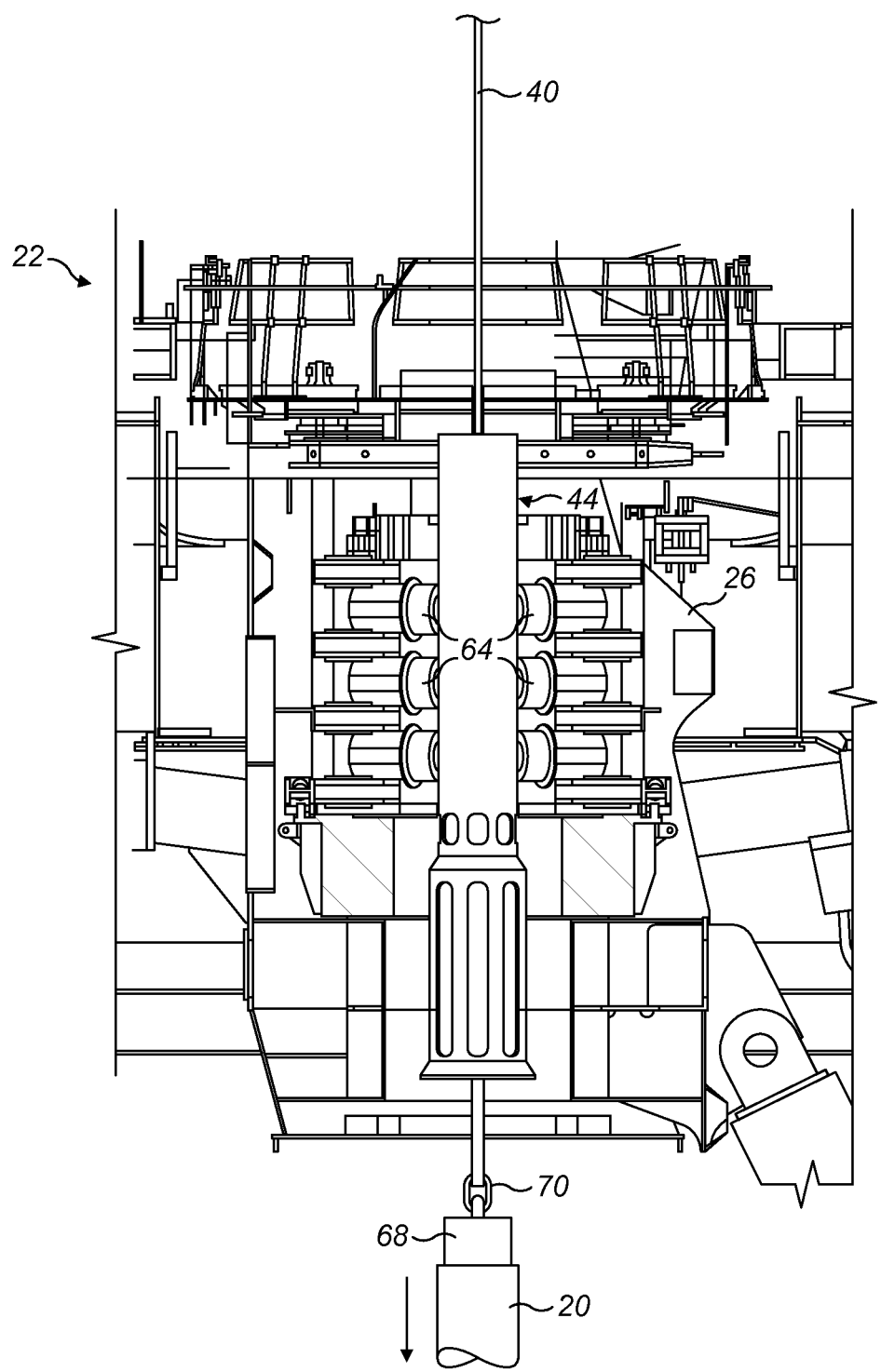

FIGS. 6a to 6c show how the sleeve 44 may be used to protect the stationary clamp 26.

FIG. 6a shows the sleeve 44 mounted on the upper end of the pipe string 20 as in FIG. 5b. An A&R wire 40 extends through the sleeve 44 to the pipe string 20, to which the A&R wire 40 may be secured via a lifting fixing 68 like that shown in FIG. 5d. The pads 64 of the stationary clamp 26 have been retracted to release the pipe string 20, whose weight load has thereby been transferred to the A&R wire 40 to start the abandonment operation.

The pipe string 20 and the sleeve 44 are shown in FIG. 6a being lowered together through the stationary clamp 26. Lowering continues until the body portion 46 of the sleeve 44 aligns with the pads 64 of the stationary clamp 26. Then, as shown in FIG. 6b, the stationary clamp 26 is closed again by extending its pads 64 to grip the body portion 46 of the sleeve 44.

In FIG. 6c, the pipe string 20 has been lowered further away from the sleeve 44 that remains fixed in the stationary clamp 26. The sleeve 44 protects the pads 64 of the stationary clamp 26 from clashing with the A&R wire 40 that supports the pipe string 20, as the A&R wire 40 continues to run through the sleeve 44 while abandonment continues.

Figure 7:
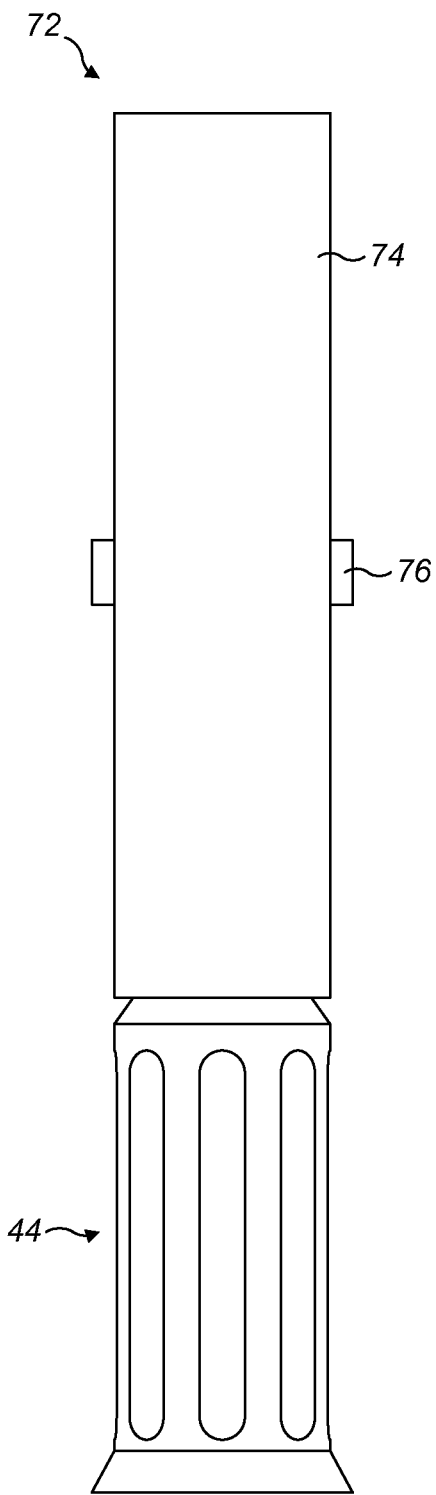
FIG. 7 is a side view of a variant of the sleeve shown in FIGS. 3 and 4.
Figure 8:
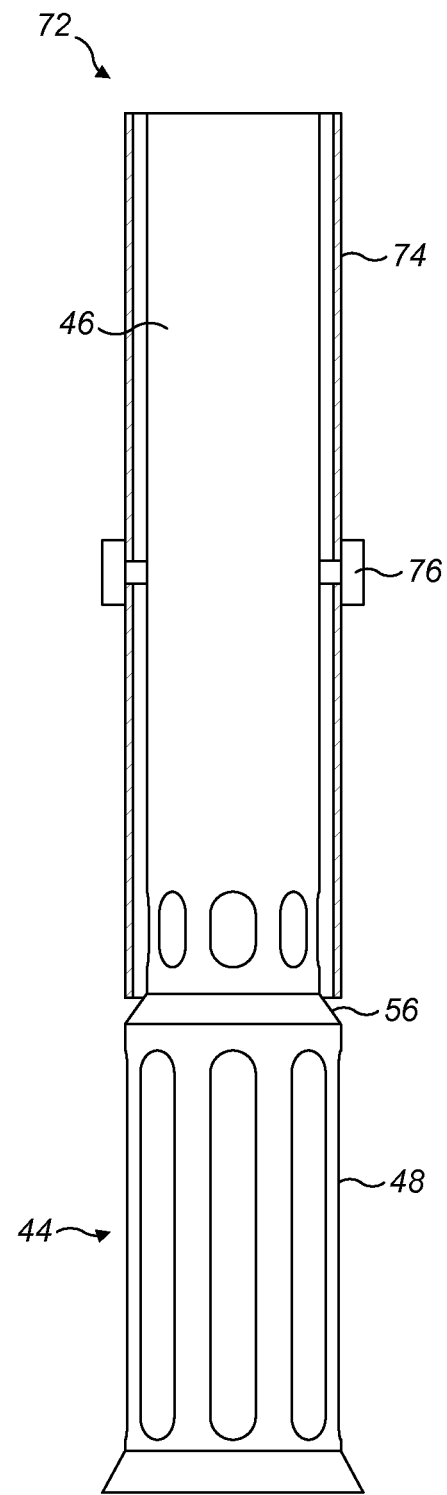
FIG. 8 is a part-sectional side view of the sleeve variant shown in FIG. 7.

FIGS. 7 and 8 show a variant of the invention in the form of a sleeve assembly 72, in which a sleeve 44 like that shown in FIGS. 3 and 4 is supplemented by an auxiliary sleeve 74. As will be explained, the auxiliary sleeve 74 can be held by the travelling clamp 30 and the sleeve 44 can be held by the stationary clamp 26. This variant therefore enables both clamps 26, 30 to be protected from an A&R wire 40 that runs through them during A&R operations.

In this example, the auxiliary sleeve 74 is a straight tube that surrounds the body portion 46 of the sleeve 44 in concentric and telescopic relation. Releasable fastenings 76 such as bolts secure the auxiliary sleeve 74 to the body portion 46.

FIGS. 9a to 9e show how the sleeve assembly 72 of FIGS. 7 and 8 may be used to protect both clamps 26, 30.

FIG. 9a shows the upper end of the pipe string 20 held by, and extending upwardly from, the stationary clamp 26. It will be noted that the pads 64 of the stationary clamp 26 are extended radially inwardly to grip the pipe string 20.

FIG. 9b shows the sleeve assembly 72 in an upright orientation mounted on the upper end of the pipe string 20. The skirt 48 of the sleeve 44 receives the upper end of the pipe string 20 in the same manner as shown in FIG. 4a. At this stage, the fastenings 76 secure the auxiliary sleeve 74 to the body portion 46 of the sleeve 44 as shown in FIG. 8. As before, an A&R wire 40 extends through the sleeve assembly 72 to the pipe string 20, to which the A&R wire 40 may be secured via a lifting fixing 68 like that shown in FIG. 5d.

Figure 9C:
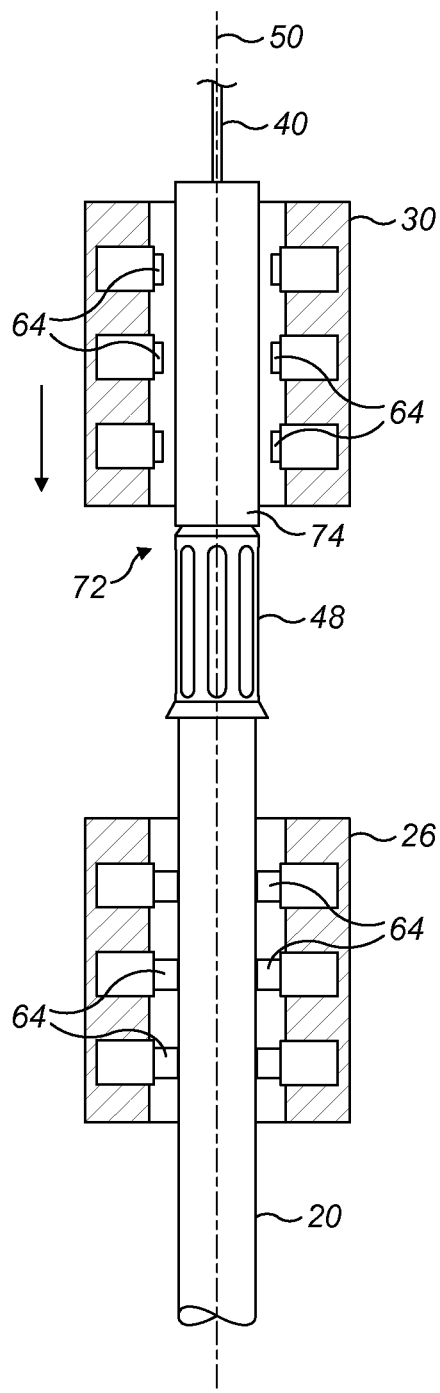

In FIG. 9c, the fastenings 76 have been removed or released to free the auxiliary sleeve 74 from the body portion 46 of the sleeve 44. However, the auxiliary sleeve 74 remains securely supported on the shoulder 56 between the body portion 46 and the skirt 48 of the sleeve 44, as will be appreciated from FIG. 8.

FIG. 9c also shows the travelling clamp 30 lowered around the sleeve assembly 72. The pads 64 of the travelling clamp 30, shown here retracted, are then extended into engagement with the auxiliary sleeve 74. The auxiliary sleeve 74 thereby protects the pads 64 of the travelling clamp 30 from clashing with the A&R wire 40 that supports the pipe string 20 and runs through the auxiliary sleeve 74.

Figure 9D:
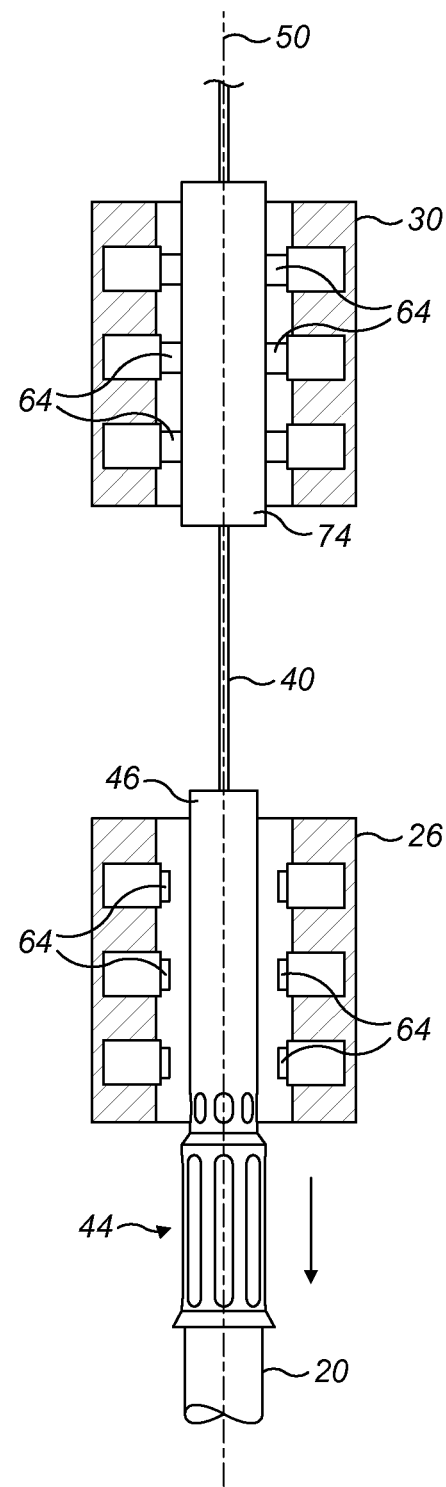

FIG. 9d shows the pads 64 of the stationary clamp 26 retracted to release the pipe string 20, whose weight load is thereby transferred to the A&R wire 40 to start the abandonment operation. The pipe string 20 is shown in FIG. 9d being lowered through the stationary clamp 26. This pulls the sleeve 44 mounted on the pipe string 20 down and out of engagement with the auxiliary sleeve 74, which remains fixed relative to the travelling clamp 30. Lowering continues until the body portion 46 of the sleeve 44 aligns with the pads 64 of the stationary clamp 26. Then, as shown in FIG. 9e, the stationary clamp 26 is closed again by extending its pads 64 to grip the body portion 46 of the sleeve 44.

Figure 9E:
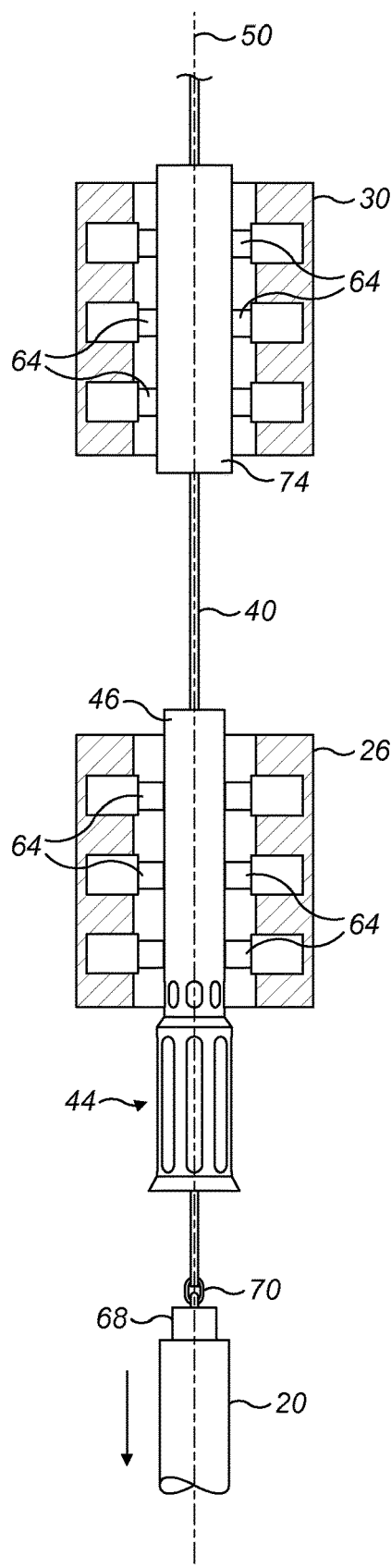

FIG. 9e shows the pipe string 20 having been lowered further away from the sleeve 44 that remains fixed in the stationary clamp 26. The sleeve 44 protects the pads 64 of the stationary clamp 26 from clashing with the A&R wire 40 as abandonment continues.

Figure 10:
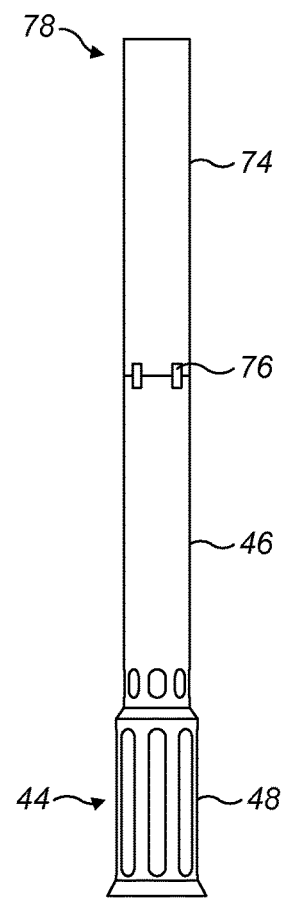
FIG. 10 is a side view of a further sleeve variant of the invention that may be used to protect both a travelling clamp and a stationary clamp of a J-lay system during A&R operations.

FIG. 10 shows a further variant of a sleeve assembly 78 of the invention. In this example, releasable fastenings 76 mount the auxiliary sleeve 74 on the free end of the body portion 46 of the sleeve 44. This arrangement allows the auxiliary sleeve 74 to have a similar outer diameter to that of the body portion 46. It will be apparent to the skilled reader that the sleeve assembly 78 shown in FIG. 10 can be used in the same way as the sleeve assembly 72 shown in FIGS. 9a to 9e to protect both of the clamps 26, 30 from an A&R wire 40 running within them.

Turning finally to FIGS. 11 to 14, these drawings show a cap 80 that may be mounted on the upper end of the pipe string 20 as a buffer to provide a resilient interface between the pipe string 20 and the sleeve 44.

The cap 80 shown in FIGS. 11 to 14 is an annular, ring-shaped structure that is rotationally symmetrical around a central longitudinal axis 50. A circular central opening 82 provides access to the interior of the pipe string 20 for a lifting fixing 68 as shown in preceding drawings.

Figure 11:
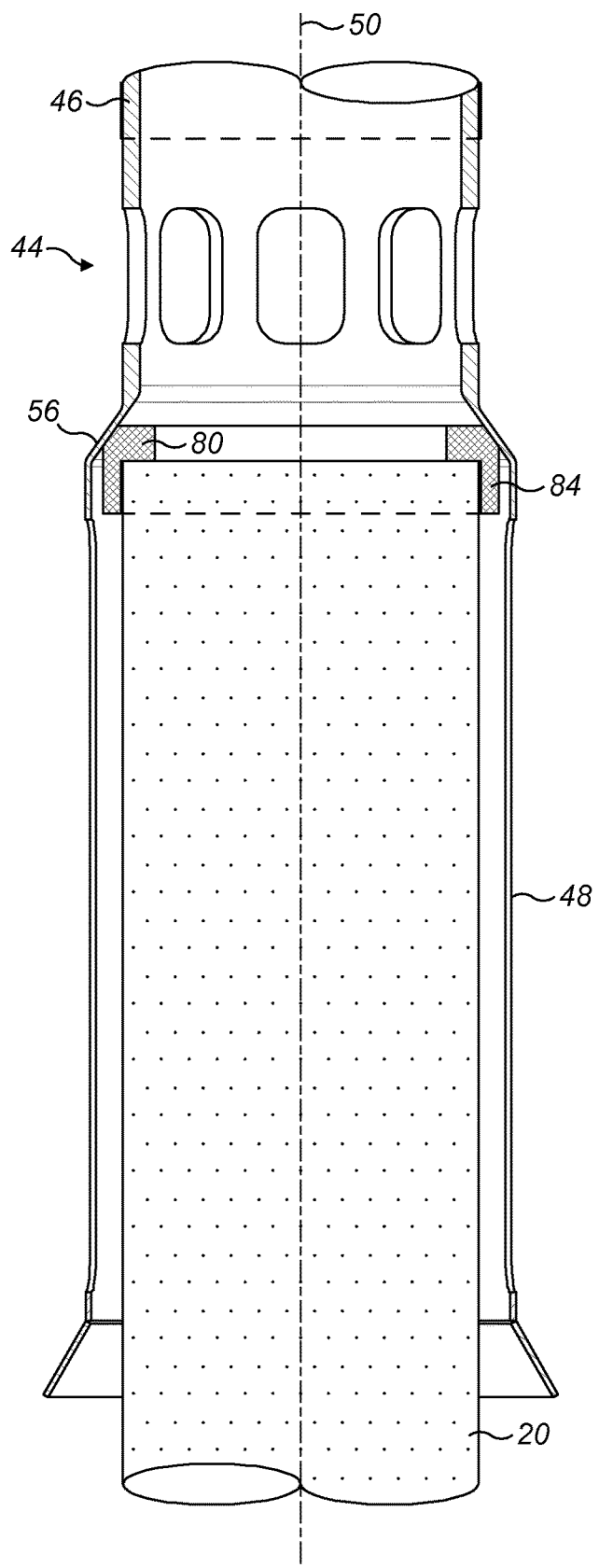
FIG. 11 is an enlarged sectional side view of an interface between a sleeve of the invention and the top of a pipe string.

A skirt-like flange 84 is a longitudinally-extending peripheral formation that surrounds the cap 80 to receive the upper end of the pipe string 20 as shown in FIG. 11. The diameter of the central opening 82 is less than the inner diameter of the flange 84, hence defining a flat annular bearing surface 86 around the central opening 82 that sits on the upper end of the pipe string 20 as shown in FIG. 11. The bearing surface 86 is in a plane that is substantially orthogonal to the central longitudinal axis 50.

The upper side of the cap 80 has a chamfered circumferential edge 88. The inclination of the chamfer with respect to the central longitudinal axis 50 substantially matches that of the shoulder 56 between the body portion 46 and the skirt 48 of the sleeve 44. Thus, as will be appreciated from FIG. 11, the chamfered edge 88 complements and bears against the shoulder 56 to seat the sleeve 44 securely onto the upper end of the upright pipe string 20.

Figure 12:
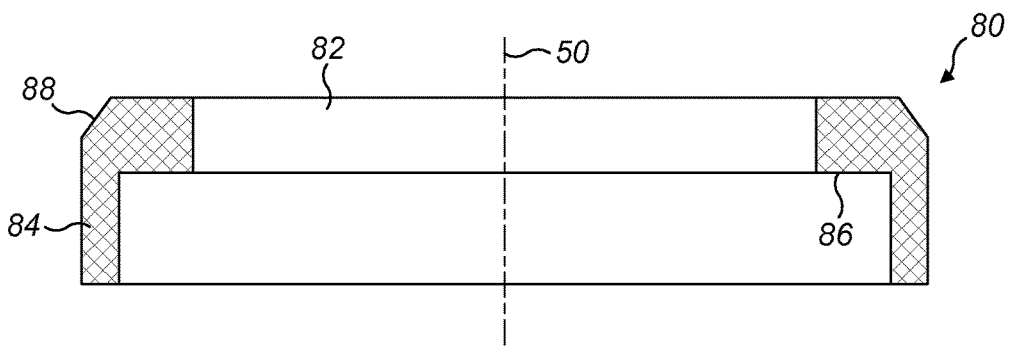
FIG. 12 is a further enlarged sectional side view of a cap of the invention that is interposed between the sleeve and the top of the pipe string at the interface shown in FIG. 11.
Figure 13:
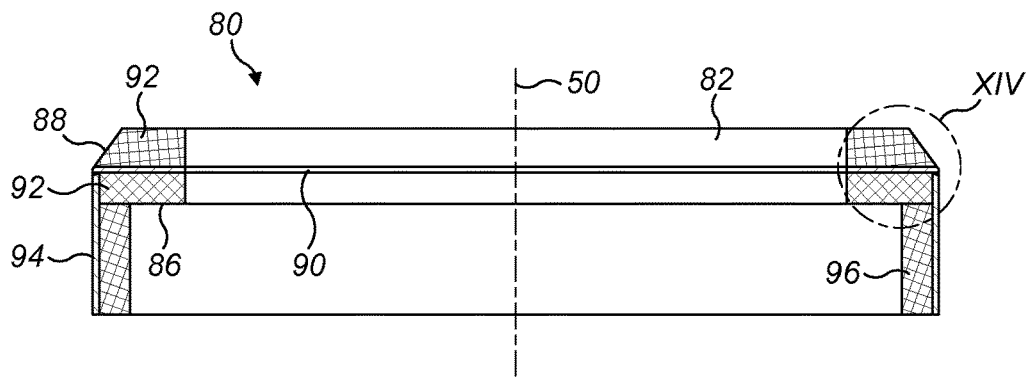
FIG. 13 is a sectional side view of a variant of the cap shown in FIG. 12.

The cap 80 shown in FIGS. 11 and 12 is of a dense, solid plastics material such as ultra-high molecular weight polyethylene, or UHMWPE.

Figure 14:
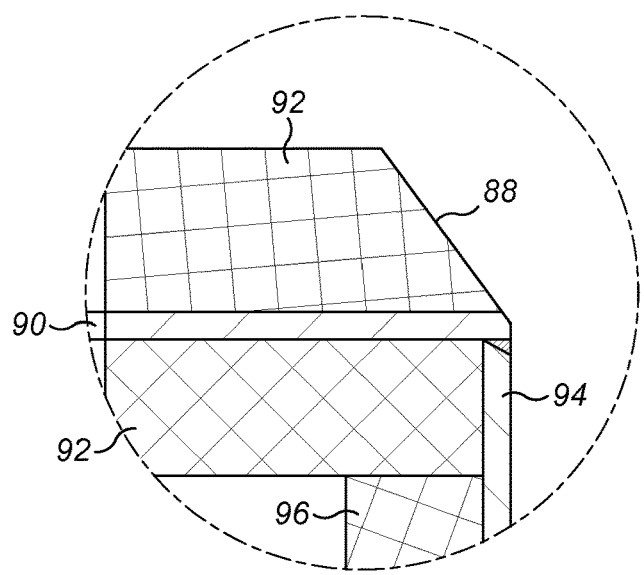
FIG. 14 is an enlarged detail view corresponding to Detail XIV of FIG. 13.

The variant of the cap 80 shown in FIGS. 12 and 14 has a layered construction of polymer materials supported by a metal core. Specifically, the central opening 82 is defined by an annular metallic top plate 90 that is sandwiched by annular layers or rings 92 of a dense, solid plastics material such as UHMWPE. The flange 84 comprises a metallic outer ring 94 welded to the top plate 90 and an inner ring 96 of a resilient material such as neoprene. The dense rings 92 that sandwich the top plate 90 bear the weight of the sleeve 44 while the resilience of the inner ring 96 of the flange 84 helps to retain the cap 80 on the upper end of the pipe string 20.

Many variations are possible within the inventive concept. For example, the sleeve and/or the auxiliary sleeve may have convex-curved, radiused or flared ends or a convex-curved internal profile to facilitate smooth running of the A&R wire within.

In preparation for a recovery operation, a sleeve and/or an auxiliary sleeve may be brought level with a travelling clamp and/or a stationary clamp and then clamped there before running an A&R wire through the sleeve or auxiliary sleeve. For example, the sleeve or auxiliary sleeve may be raised or lowered to the level of the clamp by a winch or crane, and/or the travelling clamp may be raised or lowered to the level of the sleeve or auxiliary sleeve.

In principle, the invention could be used when laying subsea pipes other than rigid pipes, such as flexible pipes or composite pipes, or indeed elongate subsea elements other than pipes, such as cables or umbilicals. The invention could also be used with hang-off clamp systems that do not rely upon friction.

The invention claimed is:

1. A method of converting a subsea laying system of a surface vessel from a laying mode to an abandonment or recovery mode comprises;
    clamping at least one tubular sleeve in at least one clamp of the laying system; and
    running a wire longitudinally through the or each clamped sleeve to suspend an elongate subsea element during abandonment or recovery.

2. The method of claim 1, comprising placing the sleeve onto an upper end of the elongate subsea element before clamping the sleeve.

3. The method of claim 2, comprising self-aligning the sleeve with the elongate subsea element along a common longitudinal axis as a consequence of lowering the sleeve onto the elongate subsea element.

4. The method of claim 3, comprising inserting the upper end of the elongate subsea element into a lower end of the sleeve.

5. The method of claim 4, comprising inserting the upper end of the elongate subsea element into a radially enlarged skirt at the lower end of the sleeve.

6. The method of claim 5, wherein the skirt is enlarged relative to a body portion of the sleeve, which body portion has an outer diameter substantially the same as that of the elongate subsea element.

7. The method of claim 5, comprising seating a shoulder at an upper end of the skirt onto the upper end of the elongate subsea element.

8. The method of claim 2, comprising interposing a buffer component at an interface between the sleeve and the upper end of the elongate subsea element.

9. The method of claim 1, comprising lowering the elongate subsea element relative to the clamped sleeve.

10. The method of claim 1, comprising effecting relative vertical movement between the sleeve and the clamp before clamping the sleeve in the clamp.

11. The method of claim 10, comprising lowering the clamp into alignment with the sleeve supported by the elongate subsea element.

12. The method of claim 11, wherein the clamp is a traveling clamp of a lay tower, movable vertically along the lay tower.

13. The method of claim 11, comprising lifting the clamped sleeve away from the upper end of the elongate subsea element.

14. The method of claim 1, comprising lowering the sleeve supported by the elongate subsea element into alignment with the clamp.

15. The method of claim 14, wherein the clamp is a stationary clamp of a lay tower, in a substantially fixed vertical position with respect to the lay tower.

16. The method of claim 1, comprising lowering the wire into the sleeve and then coupling the wire to the elongate subsea element.

17. The method of claim 16, comprising coupling the wire to the elongate subsea element within the sleeve.

18. The method of claim 17, comprising accessing or viewing the wire through a wall of the sleeve when coupling the wire to the elongate subsea element.

19. The method of claim 16, comprising coupling the wire to the elongate subsea element underwater.

20. The method of claim 1, preceded by suspending the sleeve and lifting the suspended sleeve into alignment with the clamp.

21. The method of claim 1, comprising:
clamping a first tubular sleeve in a first clamp of the laying system;
clamping a second tubular sleeve in a second clamp of the laying system; and
running the wire longitudinally through the clamped first and second sleeves to suspend the elongate subsea element for abandonment or recovery.

22. The method of claim 21, comprising:
effecting relative vertical movement between the second sleeve and the second clamp;
clamping the second sleeve in the second clamp;
effecting relative vertical movement between the first sleeve and the first clamp; and
clamping the first sleeve in the first clamp.

23. The method of claim 22, comprising:
lowering the second clamp into alignment with the second sleeve before clamping the second sleeve in the second clamp; and
lowering the first sleeve into alignment with the first clamp before clamping the first sleeve in the first clamp.

24. The method of claim 23, comprising:
placing the first and second sleeves together onto the upper end of the elongate subsea element; and
separating the first sleeve from the second sleeve.

25. The method of claim 24, comprising separating the first sleeve from the second sleeve by lowering the first sleeve supported by the elongate subsea element into alignment with the first clamp.

26. The method of claim 24, preceded by locking together the first and second sleeves and, after placing the first and second sleeves together onto the upper end of the elongate subsea element, unlocking the first and second sleeves to permit their separation.

27. The method of claim 24, comprising separating the first sleeve from the second sleeve by telescopic relative movement.

28. The method of claim 24, wherein the second sleeve rests on the first sleeve when placed together onto the upper end of the elongate subsea element.

29. A sleeve for use in protecting gripping elements of a clamp of a subsea laying system, the sleeve comprising:
a tubular body portion;
a tubular skirt on an end of the body portion, aligned with the body portion along a common longitudinal axis to define a lumen that extends continuously along the sleeve through the body portion and the skirt; and
an internal seating formation in the lumen between the body portion and the skirt;
wherein the skirt is enlarged radially relative to the body portion and has an internal diameter that is greater than the external diameter of the body portion.

30. The sleeve of claim 29, wherein the seating formation is defined by a narrowing of the lumen.

31. The sleeve of claim 30, wherein the seating formation is frusto-conical and tapers from the skirt to the body portion.

32. The sleeve of claim 29, further comprising a flared guide formation at a free end of the skirt.

33. The sleeve of claim 29, wherein a wall defining the body portion is penetrated by one or more apertures that are offset longitudinally toward a junction between the body portion and the skirt.

34. The sleeve of claim 29, wherein a wall defining the skirt is penetrated by one or more slots that extend longitudinally along the skirt.

35. The sleeve of claim 34, further comprising an auxiliary sleeve mounted on the body portion.

36. The sleeve of claim 35, wherein the auxiliary sleeve is positioned around the body portion or on a free end of the body portion.

37. The sleeve of claim 35, further comprising at least one releasable fastening that acts between the sleeve and the auxiliary sleeve.

38. In combination, the sleeve of claim 29 with an interface cap that has an outer side shaped to complement the internal seating formation and an inner side shaped to receive a pipe end.

39. The combination of claim 38, wherein the outer side of the cap has a chamfered edge whose inclination substantially corresponds to inclination of the seating formation of the sleeve relative to the longitudinal axis.

40. The combination of claim 38, wherein the inner side of the cap is surrounded by a longitudinally extending peripheral formation that is arranged to encircle or embrace a pipe end.

41. The combination of claim 40, wherein the cap further comprises a resilient component on an radially inner side of the peripheral formation.

42. The combination of claim 40, wherein the cap is penetrated by a central opening.

43. The combination of claim 42, wherein the diameter of the central opening is less than the inner diameter of the peripheral formation, defining an annular bearing surface that extends in a plane between the central opening and the peripheral formation.

* * * * *